(12) United States Patent
Cleasby et al.

(10) Patent No.: US 7,003,550 B1
(45) Date of Patent: Feb. 21, 2006

(54) METHODS AND APPARATUS FOR ESTABLISHING COLLABORATION USING BROWSER STATE INFORMATION

(75) Inventors: Andrew R. Cleasby, Marblehead, MA (US); Charles D. Cummings, Lowell, MA (US)

(73) Assignee: Cisco Technology, Inc., San Jose, CA (US)

( * ) Notice: Subject to any disclaimer, the term of this patent is extended or adjusted under 35 U.S.C. 154(b) by 844 days.

(21) Appl. No.: 09/794,863

(22) Filed: Feb. 27, 2001

Related U.S. Application Data

(63) Continuation of application No. 09/685,716, filed on Oct. 11, 2000.

(51) Int. Cl.
*G06F 15/16* (2006.01)

(52) U.S. Cl. ............... 709/205; 709/202; 709/204; 709/217; 709/223; 709/225; 709/227; 709/228; 709/248

(58) Field of Classification Search ......... 709/200–253
See application file for complete search history.

(56) References Cited

U.S. PATENT DOCUMENTS

| | | | |
|---|---|---|---|
| 5,774,670 A | 6/1998 | Montulli ................. 395/200.57 |
| 5,861,883 A | 1/1999 | Cuomo et al. ............... 345/326 |
| 5,862,330 A | 1/1999 | Anupam et al. ......... 395/200.34 |
| 5,941,957 A | 8/1999 | Ingrassia, Jr. et al. ...... 709/248 |
| 5,951,652 A | 9/1999 | Ingrassia, Jr. et al. ...... 709/248 |
| 5,954,798 A | 9/1999 | Shelton et al. ............... 709/224 |
| 5,987,376 A | 11/1999 | Olson et al. ................. 701/201 |
| 6,035,332 A | 3/2000 | Ingrassia, Jr. et al. ...... 709/224 |
| 6,070,185 A | 5/2000 | Anupam et al. ............. 709/204 |
| 6,078,948 A | 6/2000 | Podgorny et al. ........... 709/204 |
| 6,105,055 A | 8/2000 | Pizano et al. ............... 709/204 |
| 6,112,240 A | 8/2000 | Pogue et al. ................. 709/224 |
| 6,144,991 A | 11/2000 | England ...................... 709/205 |
| 6,161,137 A | 12/2000 | Ogdon et al. ................ 709/224 |
| 6,161,149 A | 12/2000 | Achacoso et al. .............. 710/4 |
| 6,178,439 B1 | 1/2001 | Feit ............................ 709/200 |
| 6,185,602 B1 | 2/2001 | Bayrakeri .................... 709/204 |
| 6,192,394 B1 | 2/2001 | Gutfreund et al. ........... 709/204 |
| 6,230,171 B1 | 5/2001 | Pacifici et al. ............... 707/512 |
| 6,230,185 B1 | 5/2001 | Salas et al. .................. 709/205 |
| 6,237,025 B1 | 5/2001 | Ludwig et al. .............. 709/204 |
| 6,240,444 B1 | 5/2001 | Fin et al. ..................... 709/205 |
| 6,256,389 B1 | 7/2001 | Dalrymple et al. .......... 379/900 |
| 6,259,701 B1 | 7/2001 | Shur et al. ................... 370/401 |
| 6,279,001 B1 | 8/2001 | DeBettencourt et al. ...... 707/10 |

(Continued)

Primary Examiner—Nabil El-Hady
(74) Attorney, Agent, or Firm—Barry W. Chapin, Esq.; Chapin & Huang, LLC

(57) ABSTRACT

Mechanisms and techniques provide the system that allows a server computer system to capture the complete state of the browser process performing on a client computer system in a remote manner. In the server computer system, which may be a collaboration adapter computer system operating a dynamic content adapter, the invention provides a system and method, such as a servlet process, for initiating a collaboration adapter session with a client computer system. The system receives a content object from the client computer system and storing document content information such as HTML and frameset content, URL information, cookie information and the like contained within the content object for shared access by participants to the collaboration adapter session. The system also generates a collaboration adapter session identification information for the collaboration adapter session based on document location information contained within the content object. The system then returns the collaboration adapter session identification information to the client computer system such that the client computer system can participate in the collaboration adapter session.

37 Claims, 7 Drawing Sheets

U.S. PATENT DOCUMENTS

| | | | |
|---|---|---|---|
| 6,295,550 B1 | 9/2001 | Choung et al. | 709/204 |
| 6,295,551 B1 * | 9/2001 | Roberts et al. | 709/205 |
| 6,297,819 B1 | 10/2001 | Furst | 345/329 |
| 6,298,356 B1 | 10/2001 | Jawahar et al. | 707/201 |
| 6,308,188 B1 | 10/2001 | Bernardo et al. | 707/530 |
| 6,310,941 B1 | 10/2001 | Crutcher et al. | 379/88.17 |
| 6,314,463 B1 | 11/2001 | Abbott et al. | 709/224 |
| 6,317,777 B1 | 11/2001 | Skarbo et al. | 709/204 |
| 6,317,786 B1 | 11/2001 | Yamane et al. | 709/224 |
| 6,330,566 B1 | 12/2001 | Durham | 707/104 |
| 6,334,141 B1 | 12/2001 | Varma et al. | 709/205 |
| 6,338,086 B1 | 1/2002 | Curtis et al. | 709/218 |
| 6,353,851 B1 | 3/2002 | Anupam et al. | 709/204 |
| 6,360,250 B1 | 3/2002 | Anupam et al. | 709/204 |
| 6,389,538 B1 | 5/2002 | Gruse et al. | 713/194 |
| 6,393,475 B1 | 5/2002 | Leong et al. | 709/223 |
| 6,411,989 B1 | 6/2002 | Anupam et al. | 709/204 |
| 6,421,678 B1 | 7/2002 | Smiga et al. | 707/102 |
| 6,535,909 B1 | 3/2003 | Rust | 709/204 |
| 6,584,493 B1 | 6/2003 | Butler | 709/204 |
| 6,675,216 B1 | 1/2004 | Quatrano et al. | 709/229 |
| 6,687,739 B1 | 2/2004 | Anupam et al. | 709/204 |
| 6,687,878 B1 | 2/2004 | Eintracht et al. | 715/512 |

* cited by examiner

METHODS AND APPARATUS FOR ESTABLISHING COLLABORATION USING BROWSER STATE INFORMATION

CLAIM TO BENEFIT OF EARLIER FILING DATE AND RELATION TO CO-PENDING PATENT APPLICATIONS

The present invention is a continuation of, and claims the benefit of the filing date of, the co pending Non-provisional U.S. patent application Se. No. 09/685,716, entitled "METHODS AND APPARATUS FOR OBTAINING A STATE OF A BROWSER", filed on Oct. 11, 2000, which is assigned to the same assignee as the present invention. The teachings and contents of this reference co-pending patent application are hereby incorporated herein by reference in their entirety.

RELATION TO CO-PENDING PATENT APPLICATIONS

This patent application is related to the following co-pending patent applications:

1. U.S. patent application Ser. No. 08/852,764, filed on May 7, 1997, entitled "CALL CENTER SYSTEM WHERE USERS AND REPRESENTATIVES CONDUCT SIMULTANEOUS AND JOINT BROWSING SESSIONS", now U.S. Pat. No. 6,295,551, issued Sep. 25, 2001.

2. U.S. patent application Ser. No. 09/347,870, filed on Jul. 6, 1999, entitled "COPY SERVER FOR COLLABOMTION AND ELECTRONIC COMMERCE,", now U.S. Pat. No. 6,675,216, issued Jan. 6, 2004.

3. U.S. patent application Ser. No. 09/685,725, filed on Oct. 11, 2000, entitled "METHODS AND APPARATUS FOR PROVIDING SHARED ACCESS TO AN APPLICATION,", now U.S. Pat. No. 6,748,420, issued Jun. 8, 2004.

The entire teachings and contents of these three related reference co-pending patent applications are hereby incorporated herein by reference in their entirety.

FIELD OF THE INVENTION

The present invention generally relates to mechanisms and techniques for establishing a collaboration adapter session allowing multiple participants to access shared content over a computer network, and more particularly, to a system that uses browser state information during establishment of a collaboration adapter session.

BACKGROUND OF THE INVENTION

The rise in popularity of computer networks such as the Internet has led software application developers to create complex software applications which interact between computer systems over the network. One example of such a software application is a collaboration system which allows multiple Internet browsers (i.e., users controlling such browsers) referred to as participants to partake in a shared communications session via a collaboration server. The shared communications session, which may be a shared web browsing session for example, is generally called a "collaboration session." A collaboration session allows multiple participants to interact with a web server or web-enabled application server so that such participants appear to the application server as a single web browser (i.e., a single user).

Generally, the collaboration server serves as a point of contact for the participant browsers and manages the shared collaboration session. When supporting one or more collaboration sessions that include multiple web browser participants, the collaboration server allows at least one participant browser to "drive" or control the shared collaboration session while the other remaining participant browsers are able to receive a copy of any shared content such as web pages just as they appeared to the controlling participant browser. In this manner, the controlling browser can guide other participant browsers through a shared web session without requiring the other users operating the other participant browsers to interact with those browsers. This is only one example of collaboration, of which there may be other forms.

Generally, upon initiation of a collaboration session using conventional collaboration techniques, each participant browser identifies itself to the collaboration server and the collaboration server begins a process of maintaining a tree or list of Uniform Resource Locator (URL) information that describes the current web page structure (e.g., frames, sub-frames, etc.) associated with the shared web session between the participant browsers and the collaboration server. The purpose of maintaining this URL information is so that when other participants join the shared collaboration session, the conventional collaboration server may provide those other participant browsers with the URL information related to the shared collaboration session so those participants can view the current web page structure related to that shared session.

SUMMARY OF THE INVENTION

Conventional collaboration techniques suffer from a variety of drawbacks. In particular, in a conventional collaboration server, state information is generally limited to URL information and is collected and maintained by and within the collaboration server itself. This limits the amount of information that is available during the startup of a collaboration session. For instance, there may be browser state information such as web page content, user supplied for field information or the like that is contained (or provided) within a participant (i.e., a user) computer system (e.g., the participant browser that initiates the collaboration session) which is unavailable to conventional collaboration servers at the start of a collaboration session. Other examples of such state information which do not exist within a conventional collaboration server at the start of a collaboration session may include any cookies within the participant browser, any time sensitive data related to a web page on display within the participant browser, or any other participant supplied information that may be of use in the collaboration session.

As a specific example, suppose a user of a browser on a client computer system is engaged in a web-based e-commerce session in which that user has an electronic shopping cart containing items that the user has selected for purchase. Now suppose that this user desires to enter into a collaborative web browsing session with an agent (i.e., a sales person) associated with the e-commerce web-site. Due to the limitations of conventional collaboration techniques, the agent may not be able to view the current contents of the shopping cart at the beginning of the collaboration session since the collaboration server may not have access to all of the required state information relating to the contents of the user's shopping cart. This is because such browser state information is typically maintained within the user's web browser on his or her computer system.

In contrast, the present invention overcomes many of the limitations of conventional collaboration systems as related to accessing and using browser state and session information obtained from web browsers for use in a shared communications (i.e., collaboration) session. Generally, the present invention provides techniques and mechanisms which can receive browser state information at a server computer system for use in establishing a collaboration adapter session. The server computer system receives the browser state information from a capture process operating in conjunction with a user's browser on a client computer system. The capture process is able to capture and bundle the browser state information into a data structure called a content object. The browser state information in the content object can include web pages or other browser content (e.g., frameset information), cookie information, URL information and/or other information (e.g., user supplied form field information).

In the server computer system, a servlet process operating according to embodiments of the invention is able to receive and extract (e.g., parse) the browser state information from within the content object for use in establishing a collaboration adapter session. In particular, the servlet process can extract document content information such as the web page content from the content object. The servlet process can also extract document identity information such as cookie information from the content object. If necessary, the servlet process can add attribute information such as cookie attributes that might be missing from the document identity (e.g., cookie) information in order to re-constitute or re-build proper cookie information that is associated with the document content information (i.e, that is associated with the web pages). The servlet process can then interact with a copy server (e.g., another process or computer system) to store the document content and identity information in the copy server. The copy server can later serve such information (e.g., web pages and cookies) to a participant requesting this information. This interaction with the copy server establishes a copy server session and the copy server returns copy server session identification to the servlet process.

The servlet process can also extract document location information from the content object such as one or more uniform resource locators (e.g., a URL for each web page in the content object). Using the copy server session identification and the document location information (e.g., a list of URL for the documents in the copy server), the servlet process can interact with a collaboration adapter (e.g., a process or another computer system, such as, for example, a Dynamic Content Adapter (CA) process operating in a computer system) to establish a collaboration adapter session. The Dynamic Content Adapter is a software product manufactured by Cisco Systems, of San Jose, Calif., USA. The collaboration adapter working in conjunction with the servlet process of this invention receives the document location information (i.e., the list of URLs) and returns a collaboration adapter session identifier to the servlet process along with a top-level URL of a document that a participant browser can access to begin collaboration. The servlet then places this top-level URL along with the collaboration adapter session identification into a template page that gets returned to the user's browser from which the content object was created. This allows the user's browser to now enter a collaboration adapter session beginning at the proper page. Likewise, the collaboration adapter can provide other participants that want to join the collaboration adapter session with the proper page and state information as received and processed by the servlet process. In this manner, a participant browser (e.g., a sales agent's browser) that enters into the collaboration adapter session (e.g., in response to a customer user initiating the collaboration adapter session as explained briefly above and in detailed herein) can receive a snapshot or copy of the user's browser state as it existed at the time that user initiated the collaboration adapter session.

More specifically, embodiments of the invention provide methods for initiating a collaboration adapter session with a client computer system. In one such embodiment, the method comprises the steps of receiving a content object from the client computer system and storing document content information contained within the content object for shared access by participants to the collaboration adapter session. The method then generates collaboration adapter session identification information for the collaboration adapter session based on document location information contained within the content object and returns the collaboration adapter session identification information to the client computer system such that the client computer system can participate in the collaboration adapter session.

In another embodiment, the step of storing the document information comprises, for each document content object identified in the content object, performing the steps of: i) extracting the document content information associated with that document content object from the content object, ii) extracting document identity information associated with that document content object from the content object, and iii) transferring the document content information and the document identify information in a collaboration content database for shared access by participants to the collaboration adapter session. A copy server process or computer system can maintain the collaboration content database into which the document content and identity information is placed.

In another embodiment, at least one of the document content objects identified in the content object is a frameset document content object. A frameset document content object contains or defines frameset information such as the location of sub-frames within the frameset. In such an embodiment, when the step of extracting the document content information from the content object extracts a frameset document content object, the step of extracting modifies a source attribute of the frameset document content object to reference a subframe location of a subframe associated with the frameset document content object. This embodiment then can correct any frameset source subframe references so that they reference proper subframe locations.

In another embodiment, the document identity information includes identifier content. Identifier content can be, for example, cookie information. In this embodiment, the step of extracting document identity information from the content object comprises the steps of obtaining the identifier content from the document identity information and obtaining identifier attributes from the server computer system. The identifier attributes can be, for example, cookie attribute values that are not contained in the document identity information within the content object. The method embodiment then combines the identifier content and the identifier attributes to reconstitute a document identifier (e.g., to create or re-constitute a valid cookie) that is associated with the document content information (e.g., for a particular page extracted from the content object). This embodiment thus gets around a problem that is present in some browsers that do not provide complete cookie information. Such browsers might, for instance, not provide the cookie attributes which are thus missing within the content object.

In another embodiment, the identifier content is cookie information and the identifier attributes are cookie attributes which include a domain name and a path associated with a location of the document content information. In this embodiment, the step of obtaining the identifier attributes obtains the cookie attributes from a configuration file in the server computer system associated with a domain identified by the content object. Selection of a configuration file can be done in a number of way. For example, the servlet process performing this method might select the file containing the identifier attributes based upon the web site for which the collaboration adapter session is being established.

In another embodiment, the step of transferring transfers the document content information and the document identity information for each document content object identified in the content object to a copy server for shared access by participants to the collaboration adapter session. Also in this embodiment, the step of storing further comprises, in response to the step of transferring, receiving a copy server session identification from the copy server.

In yet another embodiment, the step of generating collaboration adapter session identification information comprises the steps of extracting document location information (e.g., URL information) for any document content objects identified in the content object and providing, to a collaboration adapter, a request to establish a collaboration adapter session. The request includes the document location information (e.g., the URL) for each document content object in the content object. The method receives, in response to providing the request, collaboration adapter session identification information including i) a collaboration adapter session identification identifying the collaboration adapter session, and ii) document location information (e.g., a top-level URL) for a single portion of document content information maintained by the copy server for initial shared access by participants to the collaboration adapter session.

In still a further embodiment, the step of returning the collaboration adapter session identification information to the client computer system such that the client computer system can participate in the collaboration adapter session comprises the steps of forwarding, to the client computer system, the collaboration adapter session identification information. As in the aforementioned embodiment, the collaboration adapter session identification information includes i) the collaboration adapter session identification identifying the collaboration adapter session, and ii) document location information for a single portion of document content information maintained by the copy server for initial shared access by participants to the collaboration adapter session.

The invention also includes computer systems configured to perform all of the method operations in embodiments disclosed herein. Specifically, according to one embodiment of the invention, a server computer system comprises an interface, a memory, a processor and an interconnection mechanism coupling the interface, the memory, and the processor. The memory is configured with (e.g., programmed with) a collaboration servlet application, that when performed on the processor, provides a servlet process that causes the processor to initiate a collaboration adapter session with a client computer system according to the method embodiments outlined above and disclosed in detail herein.

Generally, other embodiments of the invention include a computer system configured with servlet application and a servlet process as disclosed herein to perform all of the methods disclosed herein via software control, or via hardware and/or software configured to perform those methods and the techniques disclosed herein as the invention.

Other embodiments of the invention that are disclosed herein include software programs to perform the operations summarized above and disclosed in detail below. More particularly, a computer program product is disclosed which has a computer-readable medium including computer program logic encoded thereon to provide the methods for initiating a collaboration adapter session according to this invention and its associated operations. The computer program logic, when executed on at least one processor within a computing system, causes the processor to perform the operations (e.g., the method embodiments above, and described in detail later) indicated herein. This arrangement of the invention may be provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software, firmware or other such configurations can be installed onto a computer system to cause the computer system to perform the techniques explained herein as the invention.

It is to be understood that the system of the invention can be embodied strictly as a software program, as software and hardware, or as hardware alone. Is also to be understood that the techniques and mechanisms of this invention typically perform (e.g., execute, run, or are otherwise operated) on one or more server computer systems coupled to a computer network.

By obtaining and initializing a collaboration adapter session using the complete browser state information of a client computer system, which may include user supplied information, a server computer system can copy and distribute such state information to participant browsers, thus allowing the participant browsers to join the collaboration adapter session at anytime, either during an existing collaboration adapter session, or when such a collaboration adapter session begins, while being configured just as the browser was that supplied the state information.

The invention may be embodied in systems, software and/or hardware products designed, developed and/or manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
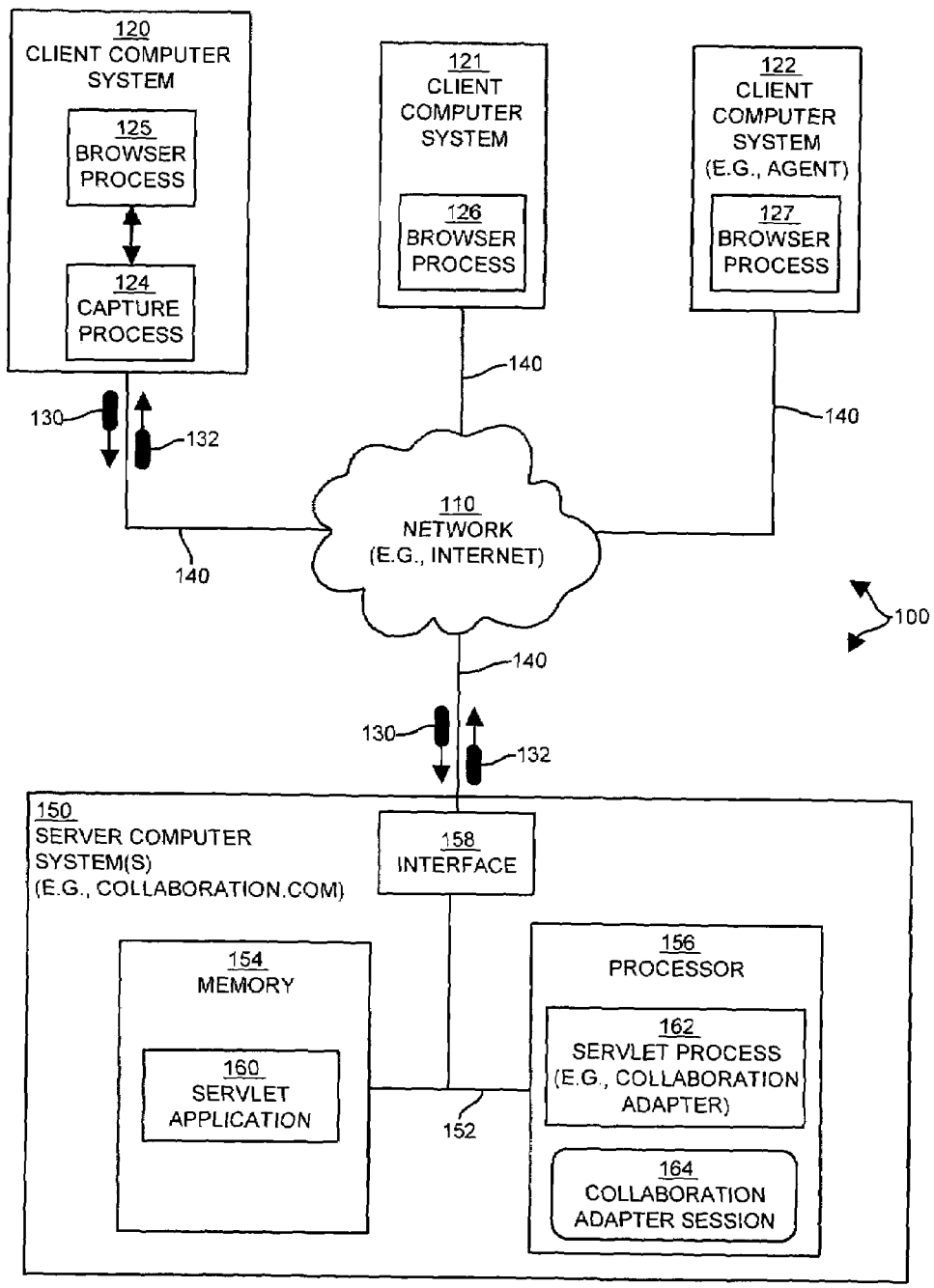
FIG. 1 illustrates a network and computing system environment that is suitable for use in describing example operations of embodiments of the invention.

Embodiments of the present invention provide techniques and mechanisms that operate within a server computer system to initiate a collaboration adapter session that allows multiple participants to partake in a shared communications session. Such a shared communications session (i.e., a collaboration adapter session) might allow, for instance, multiple participants operating separate web browser processes to concurrently interact with a single application served by a web server over a computer network such as the Internet. This is an example only and other types of collaboration can benefit from the use of the invention as well.

Preferred embodiments of the invention operate as a servlet process within a server computer system. According to such operation, when a user of a client computer system decides to initiate a shared collaboration adapter session with other participants of other browser processes on other client computer systems, a capture process interacting with that user's browser process (i.e., the capture process operating on the client computer system of the user initiating the collaboration adapter session) operates to capture browser state information associated with that user browser into a content object. The capture process on this client computer system then transmits the content object to the servlet process configured according to embodiments of this invention. Details of the operation of an example capture process that can operate on a client computer system to provide a content object in this manner are disclosed in a co-pending United States patent application entitled "METHODS AND APPARATUS FOR OBTAINING A STATE OF A BROWSER," which was filed Oct. 11, 2000 and has Ser. No. 09/685,716. The entire teachings and contents of this patent application are hereby incorporated herein by reference in their entirety.

Generally, the content object contains a snapshot of relevant portions (e.g., data) of the state of the browser process as it exists at the time (or just prior to the time) the user of the client computer system initiates a collaboration adapter session. The browser state information contained within the content object can include, for example, complete copies (e.g., the HTML contents) of one or more web pages (and frame set information, if present) as they exist within the browser process upon initiation of the collaboration adapter session, as well as any URLs and cookie information related to those web pages, and possibly any user supplied information (e.g., user supplied form field information) that might have been input or that existed at the point the user (i.e., the participant) decided to initiate collaboration. As will be explained in more detail, the content object contains or packages such browser state information in a format that allows the servlet process to extract and utilize such browser state information to initiate a collaboration adapter session.

By obtaining the complete state of browser prior to initiation of the collaboration adapter session, the servlet process can more accurately start a collaboration adapter session with participant browsers which wish to join the collaboration adapter session. That is, since the servlet process is able to obtain the complete state of a participant browser upon initiation of the collaboration adapter session with that browser, the servlet process is able to operate according to embodiments of the invention to store, manipulate (if required), and then distribute this browser state information to other participant browsers that join the shared collaboration adapter session. This allows the other participant browsers to configure themselves, in a sense, "more identically" to the participant browser that initiated the collaboration adapter session (i.e., to the participant browser that provided the original content object to the servlet process operating according to the invention).

As a brief example of such capabilities, the servlet process of the invention is able to receive a content object and parse any web pages, frameset information, URL information and cookie information from the content object as it existed within the participant browser just prior to, or at the time of initiation of, the collaboration adapter session. The servlet process can store the web page and URL information from the content object for future shared access by other participant browsers that partake in the collaboration adapter session, once the collaboration adapter session is established. The servlet process of one embodiment can then also utilize the cookie information in the content object to re-constitute or rebuild cookies that are associated with the web pages defined in the content object. Rebuilding of cookies might be required, for example, in instances where the capture process that operates on a client computer system to create the content object is unable to obtain some or all of the attributes of cookies as they maintained by the browser. This may be due to limitations of the browser's inability to provide cookie attributes to the requesting capture process. However, a servlet process operating according to this embodiment of the invention is able overcome this limitation by extracting whatever cookie information might have been available to the capture process (i.e., is able to obtain the available cookie information from within the content object) and is then able to re-constitute, for example, the missing cookie attributes from a configuration file in order to re-create valid cookies for the web pages defined within the content object. These cookies can then be stored with their associated web pages for re-distribution to participant browsers that join the collaboration adapter session. These operations allow those other participant browsers to be configured substantially identically to the participant browser that initiated the collaboration adapter session.

As another example of capabilities provided by embodiments of the invention, by using the state information of the browser process including any user supplied information obtained from the client computer systems (i.e., obtained from within the content object), a server computer system operating a servlet process of the invention can supply such browser state information to new participant(s) of a shared collaboration adapter session that has been underway for some time (i.e., an existing collaboration adapter session), without requiring the new participant(s) to navigate through the entire shared collaboration adapter session web pages from the first web page up to the point of the current state (i.e. the most recent web page) of the collaboration adapter session. In other words, a capture process can periodically operate to capture the state of a participant browser in a series of content object(s) at various points during an existing collaboration adapter session. As such, the servlet process of this invention can operate on such content object(s) as explained herein to obtain the state of participant browser(s) at any point during the collaboration adapter session. This allows new participant browsers to join an existing collaboration adapter session at anytime and, importantly, allows those participants to begin the collaboration adapter session on a more recent page of the collaboration adapter session (i.e., on the most recent page captured in the most recent content object), without having to navigate through prior pages (i.e., from the first page of collaboration up to the most recent page) in order to build up the proper browser state associated with the collaboration adapter session.

Such capabilities are not possible in conventional collaboration systems since a conventional collaboration server is typically limited to collecting URL information provided to a controlling browser process, as opposed a server receiving browser state information as in this invention. Since just URL information is available to conventional collaboration server processes, such server processes are limited in their ability to maintain accurate and complete state information (i.e., including full cookie information, user supplied information, etc.) of participant browser during the ongoing lifecycle of a collaboration adapter session, as that participant browser state information can continually change.

FIG. 1 illustrates an example of the computer network environment 100 suitable for use by the system of the invention. The environment 100 includes a server computer system 150 and client computer systems 120 through 122 coupled via data links 140 to a computer network 110, which may be the Internet, for example.

The client computer systems 120 through 122 may be personal computers, handheld computing devices, workstations or any other type of computerized devices that can perform data communications with the server computer system 150. Each client computer system 120 through 122 includes (e.g., performs, executes or otherwise operates) a respective browser process 125 through 127. Examples of the browser processes 125 through 127 include the Netscape Navigator web browser software manufactured by Netscape Communications Corporation of Mountain View, Calif., and the Internet Explorer web browser software manufactured by Microsoft Corporation of Redmond, Wash. Preferably, the most recent versions or releases of browser processes 125 through 127 operate in the client computer systems 120 through 122. A capture process 124 also operates within the client computer system 120 in this example. While not shown in this example, other client computer systems 121, 122 may also operate a version of the capture process 124 as well.

The server computer system 150 includes an interconnection mechanism 152 which couples a memory 154, a processor 156 and an interface 158. The memory 154 is encoded with logic instructions (e.g., software object code) that collectively form a servlet application 160 configured according to embodiments of the invention. The processor 156 can interpret, execute, run, operate or otherwise perform the logic instructions within the servlet application 160 in the memory 154 in order to provide a servlet process 162. In other words, the servlet process 162 represents the processor 156 performing (e.g., executing) the servlet application 160. As a result of such performance as explained herein, the servlet process 162 initiates a collaboration adapter session 164 which allows the browser processes 125 through 127 that operate within the client computer systems 120 through 122 to concurrently share the collaboration adapter session 164. It is to be understood that the term "servlet" process is meant to be general in nature and that the servlet process 162 of embodiments of this invention is not limited to being implemented as a Java-based servlet. As such, the servlet process 162 could be any type of process, program, routine, function or the like that can perform within a computer system (i.e., within a processing device such as a microprocessor).

Prior to describing the details of operation of the servlet process 162, a brief description of how a user of browser process 125 in the client computer system 120 can begin the process of initiating a collaboration adapter session 164 will be explained to assist in understanding details of the operation of embodiments of the invention within the server computer system 150, which are presented thereafter.

Turning attention to the client computer system 120, to begin the process of collaboration, a user of the browser process 125 on the client computer system 120 in this example navigates (i.e., accesses web pages) to a collaboration initiation web page (not shown). Such a web page might be served by the server computer system 150, though this is not required for the invention. At this point the browser processes 125, 126 and 127 and the server computer system 150 have not yet entered into or created the shared collaboration adapter session 164. The collaboration initiation page may, for example, be one or more web pages displayed (e.g., as a frameset) to the user within the browser process 125. The pages may have form fields which prompt the user of the browser process 125 for user supplied information such as collaboration authentication information such as a name, password, address or the like.

During the process of the user navigating to the collaboration initiation page or during the process of the user completing the collaboration initiation page (i.e., as the user enters his or her collaboration authentication information such as his or her name, password, etc.), the server computer system 150 can serve (e.g., can upload) the capture process 124 to the client computer system 120. As explained in the formerly referenced co-pending patent application, the capture process 124 may be a Java applet embedded in the collaboration initiation page, for example, or may be any other type of processing logic which may be uploaded and executed, interpreted, run or otherwise performed on the client computer system 120.

Once the capture process 124 is loaded onto the client computer system 120 and begins to perform, the capture process 124 is able to capture the state of the browser process 125 by gathering, accessing or otherwise collecting, for example, i) document location information such as uniform resource locators (URLs) for any web pages within the browser process 125, ii) document identity information including identifier content such as cookie information (application and/or session cookie information), iii) document content information such as the HTML and/or JavaScript contents or any web pages, frames sets, documents or applets that are associated with (e.g., loaded into) the browser process 125, and iv) user supplied information within any form fields of the collaboration initiation page. The capture process 124 is able to capture, format and store such browser state information within a content object 130, an example of which will be explained in detail later with respect to FIG. 3. The capture process 124 then transmits the content object 130 from the client computer system 120 over the computer network 110 to the server computer system 150 for receipt by the servlet process 162. The content object 130 is then received at the server computer system 150 by the servlet process 162. The servlet process 162 then performs the operations of embodiments of the invention as explained herein to establish the collaboration adapter session 164 and returns collaboration adapter session identification information 132 to the browser process 125 that operates within the client computer system 120 that initiated the collaboration adapter session 164.

Figure 2:
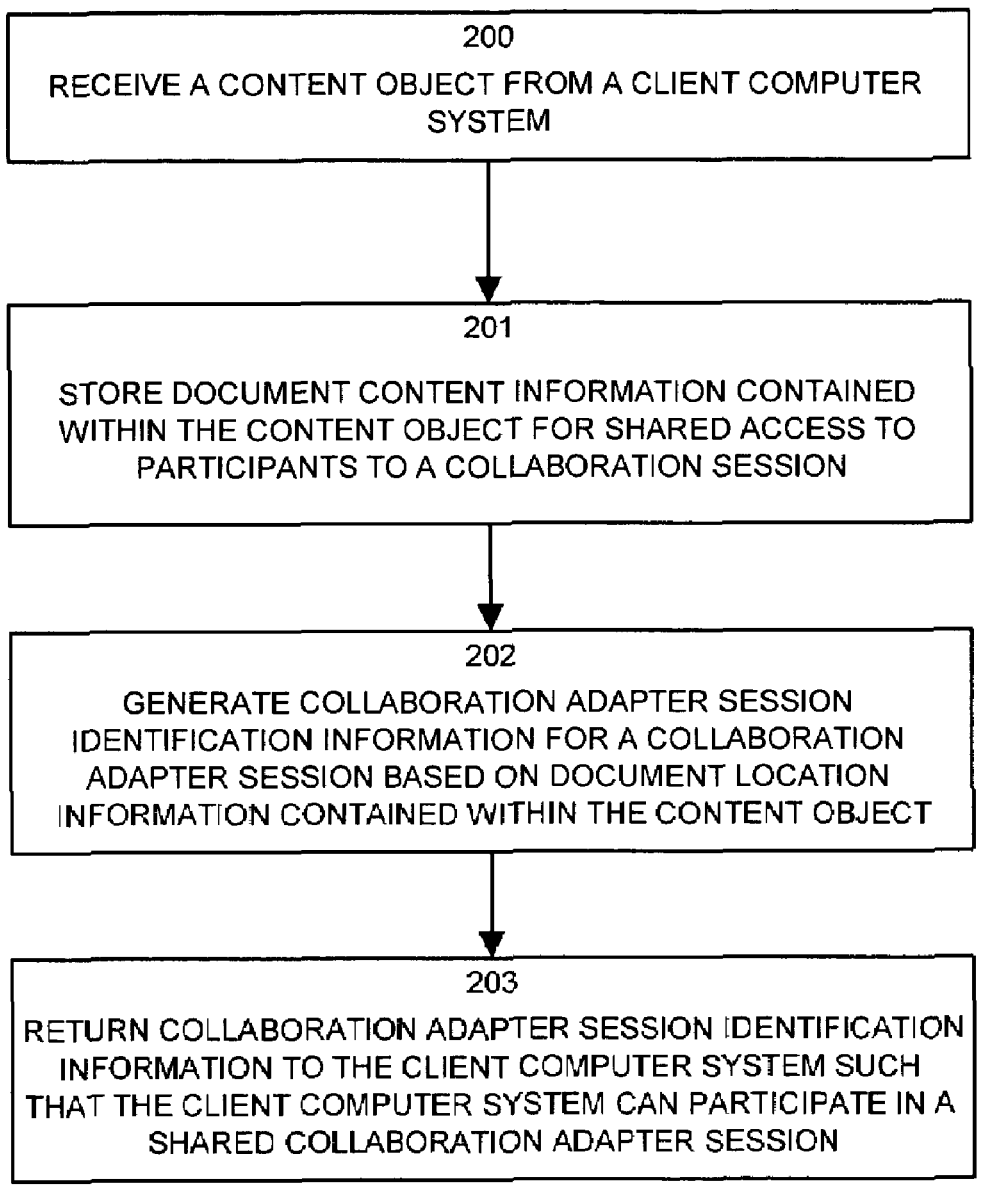
FIG. 2 illustrates a flow chart of processing steps as performed according to embodiments of the invention to initiate a collaboration adapter session.

FIG. 2 is a flow chart of the general processing operations as performed by the servlet process 162 configured in accordance with embodiments of the invention.

In step 200, the servlet process 162 receives a content object (e.g., 130 in FIG. 1) from a client computer system (e.g., from the capture process 124 operating within the client computer system 120 in FIG. 1).

Next, in step 201, the servlet process 162 stores document content information (e.g., web pages or other content as well as cookie information, not specifically shown in FIG. 1) contained within the content object 130 for shared access to participants to a collaboration adapter session (e.g., 164 in FIG. 1) that is to be established (e.g., for access by browser processes 126, 127 in FIG. 1, when those browser processes join the collaboration adapter session). As will be explained further, the process of storing such document content information can include i) the rebuilding of document identity information such as cookie information to include, for example, missing cookie attributes, and ii) correcting any original frameset source attributes or references associated with documents contained in framesets in the content object 130, as well as other processing tasks.

In step 202, the servlet process 162 generates collaboration adapter session identification information (e.g., 132 in FIG. 1) based on document location information (e.g., URL information) contained within the content object 130. As will be explained, during the generation of collaboration adapter session identification information 132, the servlet process 162 can interact with a collaboration adapter (not specifically shown in FIG. 1) to properly establish the collaboration adapter session 164. As will be explained further, such collaboration adapter session identification information 132 may contain a top level URL of a web page that participant browsers can reference when joining the collaboration adapter session in addition to containing a collaboration adapter session ID.

In step 203, the servlet process 162 returns the collaboration adapter session identification information 132 to the client computer system 120 such that the client computer system can participate in a collaboration adapter session 164. In this manner, when a client computer system (e.g., 120 in this example) receives the collaboration adapter session identification information, that client is able to participate in the shared collaboration adapter session 164 and can obtain the duplicate copy of the browser state information as provided to the servlet process 162 within the content object 130.

Figure 3:
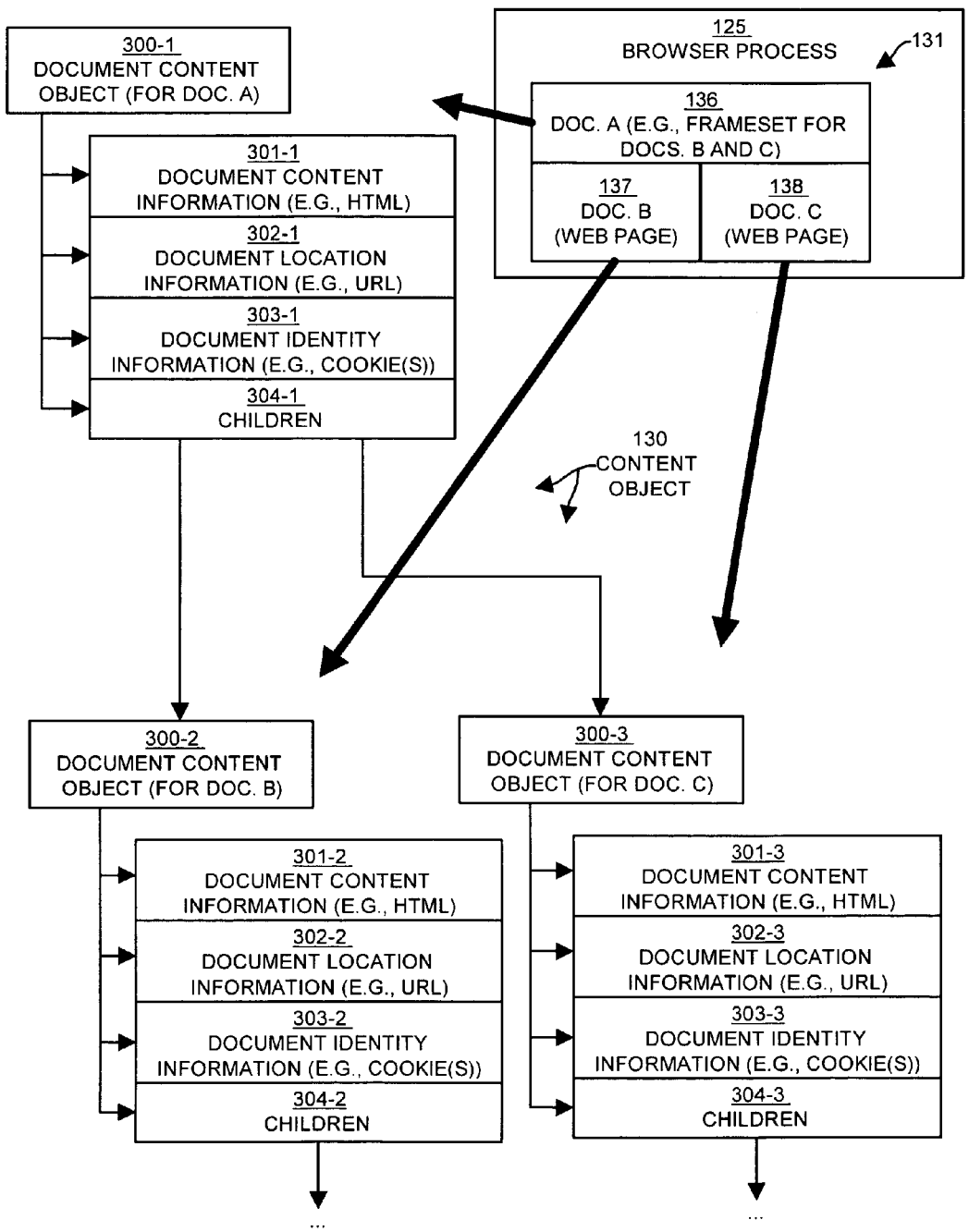
FIG. 3 illustrates an example content object data structure including associated document content objects as provided to a servlet process configured according to embodiments of the invention.

FIG. 3 illustrates an example content object data structure 130 containing browser state information for the browser process 125. As illustrated in this example, the browser process 125 contains (i.e., displays to a user) a frameset 131 containing three documents 136, 137 and 138. The first document 136 (DOC. A) in the browser process 125 is the main the web page or document of the frameset 131, while the other two documents 137 and 138 (DOC. B and DOC. C) are web pages within other frames in the frameset 131 of documents. Based on the frameset 131 of documents 136 to 138, the capture process 124 (FIG. 1) generates the content object 130 as shown in FIG. 3, and transmits such a content object 130 to the servlet process 162 for processing according to embodiments of the invention.

In this example, the content object 130 is represented hierarchically as a tree that contains respective browser state information for the three documents 136 through 138, each represented by a respective document content object 300-1 through 300-3. Stemming from each document content object 300-1, 300-2 and 300-3 are specific document information fields 301 through 303 which the capture process 124 populates with various portions of browser and document state information related to the documents 136 through 138 that the capture process 124 discovers (as explained in the formerly referenced co-pending U.S. patent application) in the browser process 125.

By way of example, the document content object 300-1 represents the various portions of state information related to the document 136 (DOC. A) in the browser process 125, which for this example might be considered the top level document of the frameset 131. The document content information 301-1 is a content object data structure which contains the entire set of HTML, including any HTML tags, statements, instructions, scripts, logic and/or code for the document (e.g., the web page) 136. Likewise, the document location information 302-1 contains, in this example, the URL information (i.e., the top-level URL) required in order to locate the document content information 301-1 (e.g., the web page) represented by the document 136. The document identity information 303-1 includes, in this example, any cookie information that the capture process 124 is able to extract or otherwise obtain from the browser process 125 as related to the document 136.

In some instances, depending upon the capabilities of the browser process 125, the document identity information 303 for a particular document content object 300 may only contain identifier content such as limited cookie information which does not contain, for example, cookie attributes. That is, certain browser processes 125 are unable to provide cookie attributes to the capture process 124, and thus the document identity information 303 for a particular document content object 300 might only contain identifier content such as partial cookie information to the extent that the capture process 124 was able to obtain from the browser process 125.

Figure 4:
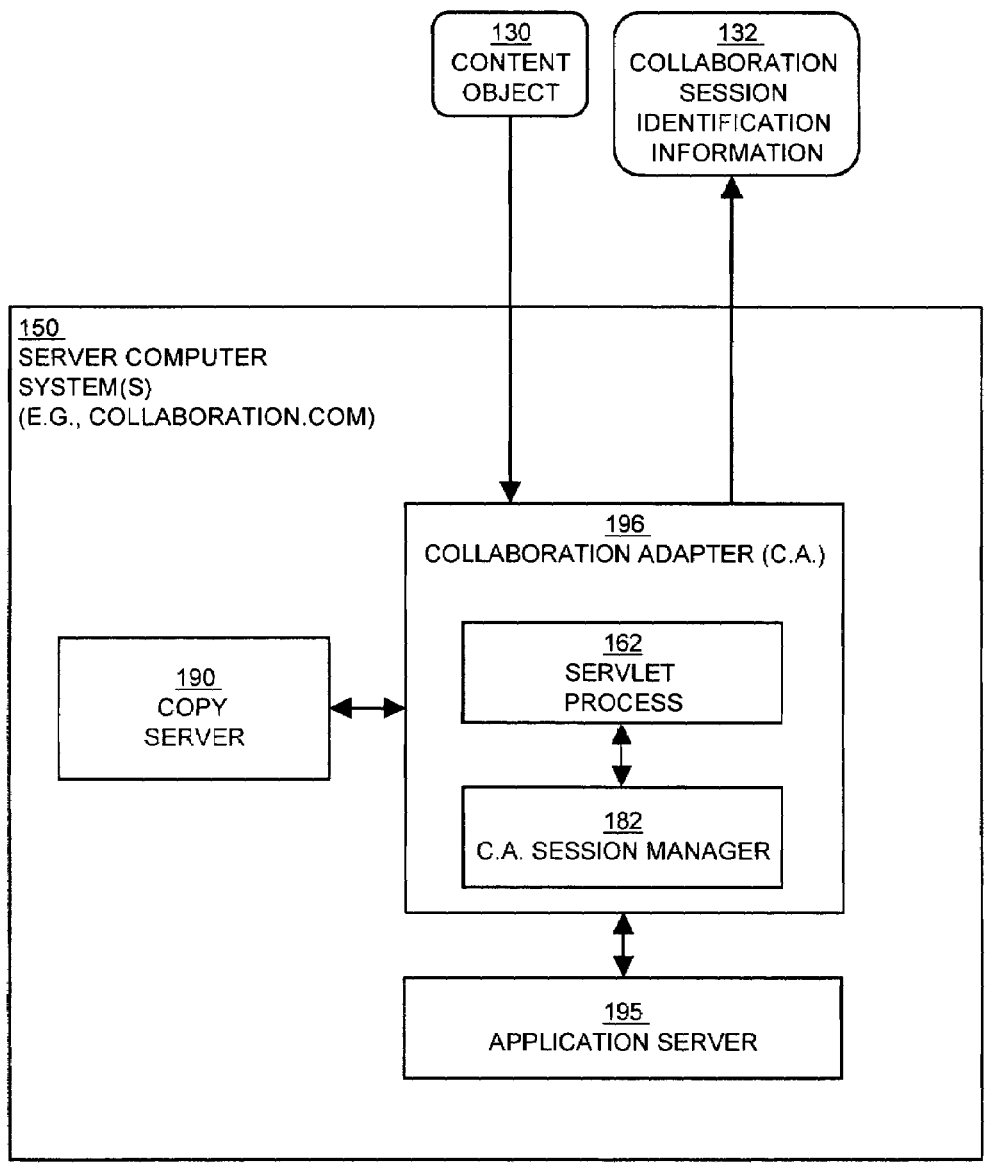
FIG. 4 illustrates a high-level architecture of a server computer system environment configured according to embodiments of the invention.

FIG. 4 illustrates a high-level architecture of the configuration of one or more computer systems which operate collectively as the server computer system 150. While the example embodiment of the invention illustrated in FIG. 1 shows the server computer system 150 is a single computer system including the memory 154 and the processor 156, a preferred configuration of the environment in which the invention operates includes multiple computer systems responsible for certain aspects of the collaboration operation. In particular, in this example configuration, the server computer systems 150 collectively operate as a collaboration web site (e.g., collaboration.com) on the computer network 110 (FIG. 1) that supports collaboration. Included in this configuration are a copy server computer system 190, an application server computer system 195 and a collaboration adapter (CA) 196. In this particular example embodiment, the servlet process 162 as explained herein operates within the collaboration adapter 196 and interfaces with a CA session manager 182 to establish the collaboration adapter session 164, as will be explained further. While not shown specifically in this figure, it is to be understood that the other computing system (e.g., 190, 195, 196) each contain typical components found within computing devices such as a processor, a memory system configured with an operating system and other required processes, and so forth.

Figure 5:
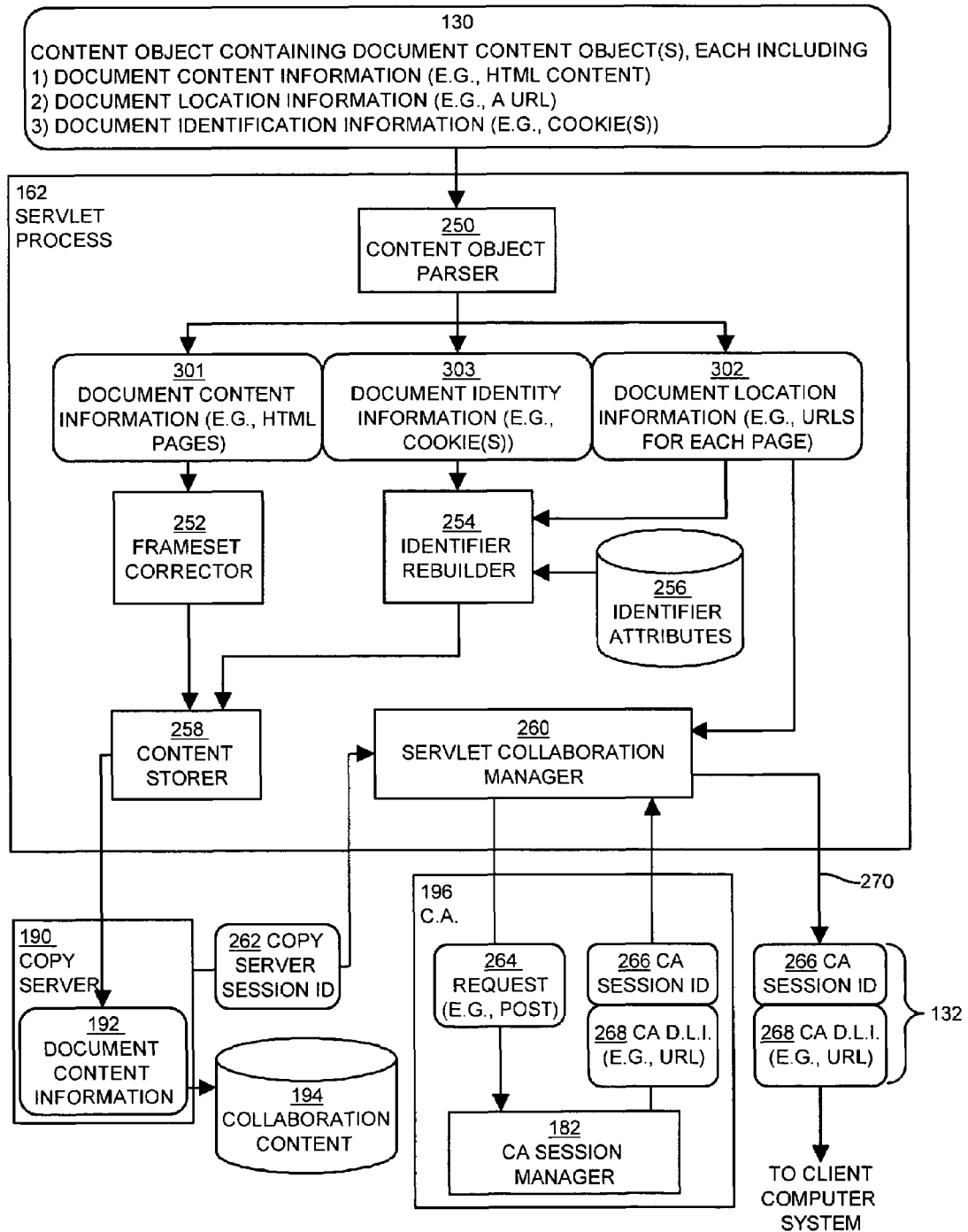
FIG. 5 illustrates a data flow diagram showing details of the processing functions and data within a servlet process configured according to embodiments of the invention.

FIG. 5 illustrates a data flow and processing operation diagram showing further details of the interaction between the servlet process 162 and the various server computer system components (e.g., copy server 190, collaboration adapter 196) within the server computer system 150. With respect to FIG. 5, data structures, document content, collaboration adapter session identification information and the like are illustrated as boxes having rounded corners, while processing logic such as the processing operations that take place within the servlet process 162 and processing components such as computer systems are illustrated as rectangular boxes having sharp corners. Using such identifiers, the processing of data (i.e., rounded corner boxes) by the various processing components (i.e., sharp cornered boxes) can be more readily understood. To this end, the servlet process 162 includes processing operations that include a content object parser 250, a frameset corrector 252, an identifier rebuilder 254, a content storer 258, and a servlet collaboration manager 260. Such processing operations represent subroutines, procedures, functions, libraries (e.g., dynamically linked libraries or DLLs) or the like that perform particular functionality during operation of the servlet process 162. Such functionality will be described next with respect to the flow chart of processing operations shown in FIGS. 6 and 7.

Figure 6:
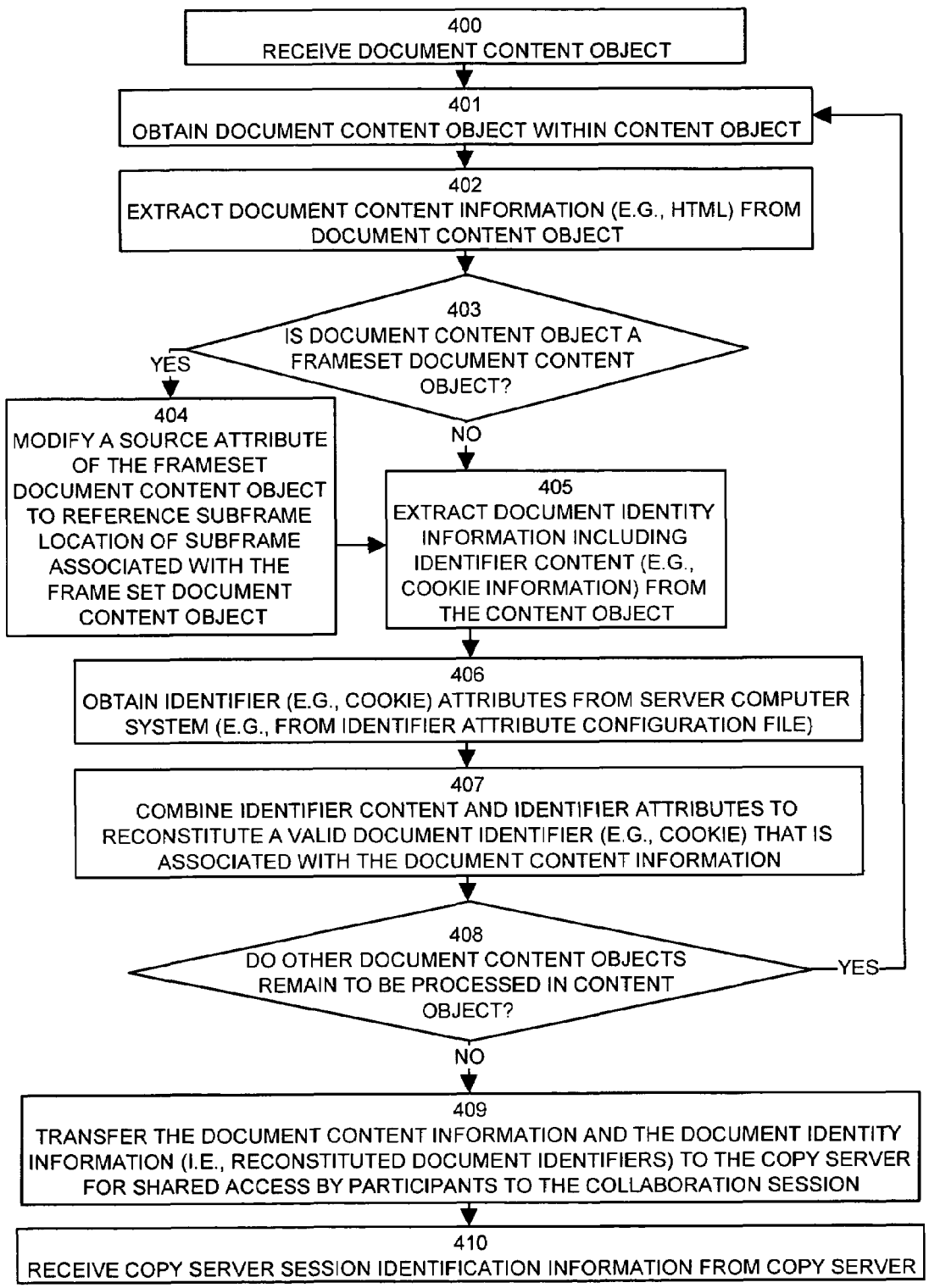
FIG. 6 is a flow chart of detailed processing steps which show the operation of a servlet process configured according to one embodiment of the invention.
Figure 7:
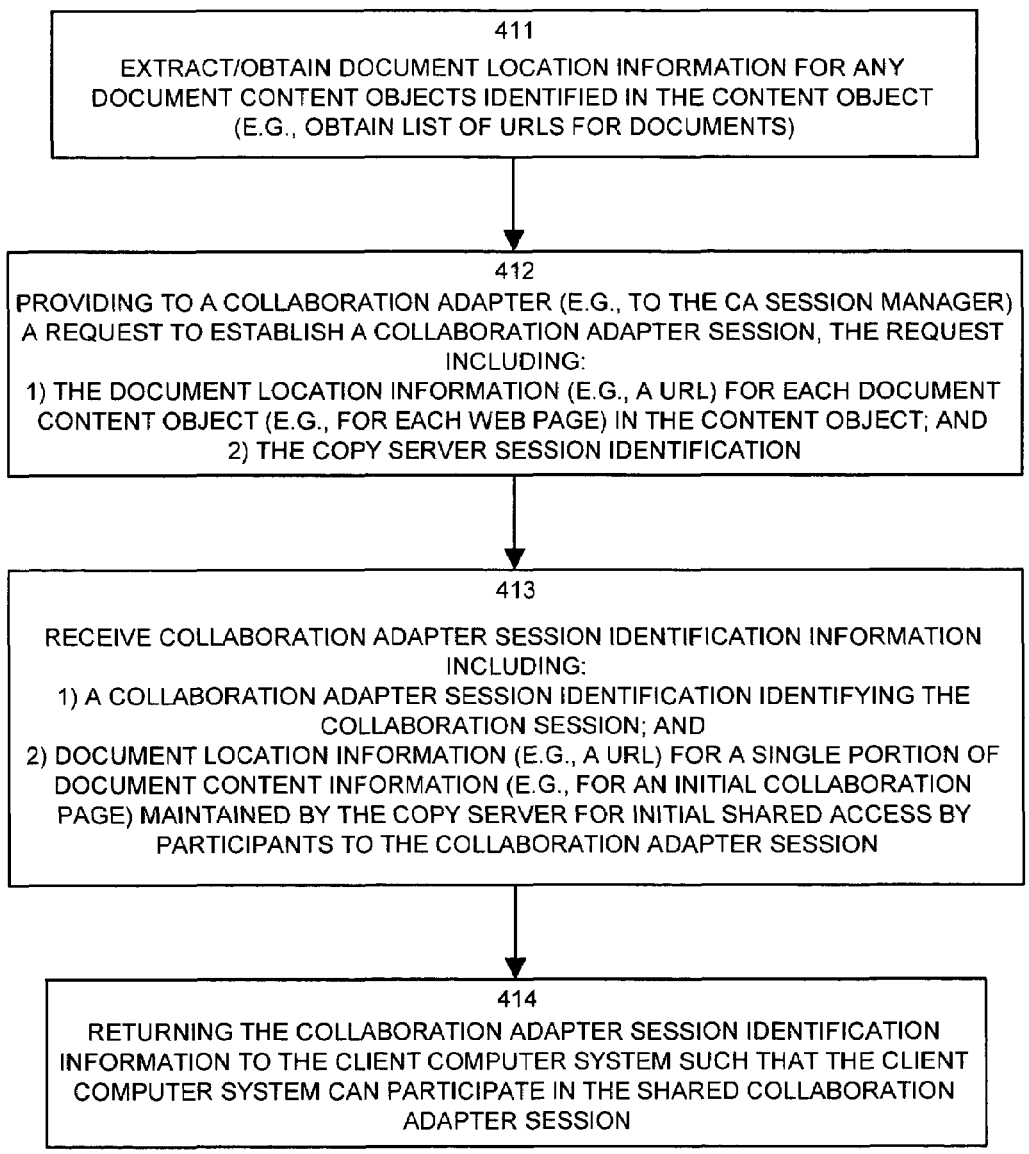
FIG. 7 is a continuation of the flow chart of FIG. 6 which shows further detailed processing operations of a servlet process configured according to one embodiment of the invention.

FIGS. 6 and 7 illustrate a flow chart of processing steps as performed by a servlet process configured according to embodiments of the invention, such as the servlet process 162 and its associated functions 250, 252, 254, 258 and 260, as shown for example in FIG. 5.

Generally, the processing steps illustrated in FIG. 6 shown the details of processing to receive a content object 130 from a client computer system (e.g., 120 in FIG. 1) and to process and store the document content and identity information contained within the content object 130 for shared access by participants to a collaboration adapter session. The processing steps which continue onto FIG. 7 primarily illustrate the details of processing as performed by the servlet process 162 to obtain the document location information and to generate the collaboration adapter session identification information 132 for the collaboration adapter session 164 (FIG. 1) and to return the collaboration adapter session identification information 132 to the browser process 125 operating in the client computer system 120 (FIG. 1). The processing steps shown in FIGS. 6 and 7 will be explained with reference to the detailed architecture of the example embodiment of the servlet process 162 as shown in FIG. 5.

In step 400 in FIG. 6, the content object parser 250 (FIG. 5) within the servlet process 162 receives the content object 130. As previously explained with respect to FIG. 3, the content object 130 contains one or more document content objects 300 that each include document content information (e.g., HTML contents) 301, document location information (e.g., a URL indicating a location of the HTML contents) 302, and document identification information containing identifier content (e.g., cookie information) 303.

In step 401, the content object parser 250 begins to parse the content object 130 by obtaining the first or top-level document content object 300-1 within the content object 130. Preferably, the document content objects 300 within the content object 130 are arranged in a hierarchical manner such as those in the tree shown in FIG. 3. Accordingly, upon the first the iteration of step 401, the content object parser 250 obtains and begins processing the document content object 300-1.

In step 402, the content object parser 250 extracts, from the document content object 300-1, the document content information 301-1 which may be, for example, HTML or another type of markup or scripting language that defines the content of a web page.

In step 403, the frameset corrector 252 (FIG. 5) within the servlet process 162 determines if the document content object is a frameset document content object. That is, in step 403, the frameset corrector 252 determines if the document content information 301, such as the HTML code, contains any frameset information or frameset page references. If such frameset information exists within the document content object 300 (e.g., within the document content information 301), the possibility exists that source attributes or page references in the frameset information within the content object 130 incorrectly reference a URL or other location information associated with a document to be displayed within the frameset. In other words, frameset source attributes might be incorrect within the document content information 301 extracted in step 402. Such frameset source attributes might be incorrect for example, because the capture process 124 might incorrectly obtain frameset information from the browser process 125 during creation of the content object 130 or, alternatively, the location (e.g., a URL) of a page referenced by a frame might change once the document content information 301 for that page is placed onto the copy server 190 (as will be explained).

To correct such possible incorrectness with frameset information or references, in step 403, processing proceeds to step 404 (if such frameset information is present in the document content information) at which point the frameset corrector 252 modifies any source attributes of the frameset document content object to properly reference the correct document location (e.g., the correct URL location) of the document associated with the frameset document content object. In other words, if the capture process 124 captures document content information 301 that contains frameset attributes that incorrectly reference source web pages, in step 404, the frameset corrector processing 252 within the servlet process 162 modifies the actual frameset source page references within the HTML document (i.e., within the document content object 201) to contain the URL of the document content 301 as it will exist within the copy server (as will be explained next).

Next, following processing step 403 (or step 404 if frameset information exists, as explained above), the servlet process 162 activates the identifier rebuilder 254 which performs step 405 to extract the document identity information 303 (303-1 in this particular example) which includes any identifier (e.g., cookie) content such as, for example, cookie information for the document content object 300-1 that is currently being processed. In other words, in step 405, the identifier rebuilder 254 (FIG. 5) retrieves the document identity information 303-1 containing, for example, any cookie information that the capture process 124 was abler to capture and place into the content object 130. As discussed briefly above, it is possible that the capture process 124 might experience difficulty with certain browser processes when attempting to capture complete cookie information. By way of example, some browsers do not provide cookie attributes when they receive calls to obtain cookie information associated with a particular web page. As such, the identifier rebuilder 254 within the servlet process 162 is able to extract any available cookie information within the document identity information in step 405 for rebuilding a correct cookie as explained below in steps 406 and 407.

In step 406, the identifier rebuilder 254 obtains identifier attributes from the server computer system 150. For example, as illustrated in FIG. 5, the identifier rebuilder 254 can obtain the identifier attributes 256 from an identifier attributes configuration file that is accessible to the servlet process 162. The selection of specific identifier attributes and/or a specific identifier attribute configuration file may be based upon the particular collaboration web site (e.g., collaboration.com) for which the collaboration adapter session is being initiated. In other words, since the particular collaboration initiation web page presented to user of the browser process 125 provides an option (e.g., a hyperlink) to allow the user to begin the initiation process of a collaboration adapter session, it is typically known to the servlet process 162 that a set of particular identifier attributes (e.g., cookie attributes) can be used to properly re-construct a page identifier (e.g., a cookie).

In step 407, the identifier rebuilder 254 combines the identifier content from the document identity information 303 (e.g., the cookie information for document content object 300 within the content object 130) with the identifier attributes 256 (obtained in step 406) to re-constitute a valid document identifier (e.g., the complete cookie) that is associated with the document content information 301 for this document content object 300. In other words, in steps 406 and 407, the identifier rebuilder 254 recreates complete cookies for the web page(s) defined within the content object 130.

Next, in step 408, the servlet process 162 determines if any other document content objects (e.g., 300-2, 300-3) remain to be processed in the content object 130 according to steps 401 for 407, as explained above. If other document content objects 300 exist in a content object 130 and have not yet been processed by the servlet process 162, servlet processing returns to step 401 for processing of the next document content object 300. This process repeats for each document content object 300 in the content object 130.

Once the servlet process 162 determines that there are no other document content objects 300 that remain to be processed in a content object 130 (step 408), processing proceeds to step 409 at which point the servlet process 162 activates the content storer 258.

In step 409, the content storer 258 transfers the document content information 301 for each document content object 300 processed according to steps 401 through 408 (e.g., document content information 301-1 through 301-3 for the example content object 130 shown in FIG. 3) along with the document identity information 303 (i.e., the re-constituted document identifiers associated with each portion of document content information 301) for each document (i.e., the cookies for each page) to the copy server 190 to enable shared access to this information by participants to the collaboration adapter session.

As illustrated in FIG. 5, the copy server 190 receives the document content information 301 and the document identity information 303 and proceeds to stores or otherwise maintain a cache of the document content information 301 within the collaboration content database 194. Essentially, the copy server 190 operates to maintain and serve the copies of the shared web pages and cookies (i.e., the document content and identity information) as requested by participant's browsers (e.g., 125 through 127 in FIG. 1) during a shared collaboration adapter session. Details of the operation of the copy server computer system 190 which is suitable for use by the invention are described in co-pending U.S. patent application Ser. No.: 09/347,870, filed Jul. 6, 1999, entitled "COPY SERVER FOR COLLABOMTION AND ELECTRONIC COMMERCE", now U.S. Pat. No. 6,675,216, issued Jan. 6, 2004, the entire teachings and contents of which are hereby incorporated herein by reference.

Once the copy server 190 has received and processed the document content information 301 and the associated document identity information 303, the copy server 190 returns a copy server session identification information 262 back to the servlet process 162 for receipt by the servlet collaboration manager 260.

At this point in processing, the servlet process 162 has reconstructed the browser state information (e.g., any web page content and cookie information) that existed within the browser process 125 at the point time the user of a browser decided to initiate a collaboration adapter session. The servlet process 162 has also provided the browser state information to the copy server 190 which handles the responsibility of providing the browser state information to any other participant browser processes (e.g., 125 through 127) that join the collaboration adapter session. The remaining processing that is performed in preferred embodiments of the servlet process 162 handles the establishment of a collaboration adapter session 164 within the collaboration adapter 196 (FIG. 4).

FIG. 7 illustrates a flow chart of the remaining processing steps as performed by the servlet process 162 to complete the establishment of the collaboration adapter session 164. Referring to the servlet process architecture as shown in FIG. 5, steps 411 to 414 in FIG. 7 are preferably performed by the servlet collaboration manager 260.

In step 411, the servlet collaboration manager 260 extracts or otherwise obtains the document location information 302 provided for each document content object 300 by the content object parser 250. The document location information 302 for a particular document content object 300 represents the URL or other location identifier information that specifies the location of the document content information 301 for the document content object 300 within, for example, the computer networking environment 100. This may be the URL of the document as located within the copy server 190 for example. Essentially then, in step 411, the servlet collaboration manager 260 compiles a list of URLs for the documents (i.e., the web pages) represented within the content object 130.

Next, in step 412, the servlet collaboration manager 260 provides a request 264 (FIG. 5) to establish a collaboration adapter session with a collaboration adapter computer system (e.g., with the CA 196 in this example). In preferred embodiment of the invention, the collaboration adapter to which the request 264 is sent is the CA session manager process 182 that operates within the collaboration adapter computer system 196. The request 264, which may be in the form of a hypertext transport protocol (HTTP) POST operation, includes the document location information (e.g., the URL) for each document content object (e.g., for each web page) defined within the content object 130 (e.g., preferably the URL of the document as it is stored within the copy server 190), as well as the copy server session identification information 262. That is, the CA session manager 182 receives the request 264 that includes the URL information for each document maintained by the copy server 190 as well the copy server session identification information 262 so that it can properly direct requests for such pages during collaboration between participant browsers (e.g., 125, 126, 127).

As will be explained shortly, the CA session manager 182 manages the collaboration adapter session 164, once the session is established. As such, the CA session manager 182 is presented with participant browser requests for shared documents (e.g., Web pages) during the lifetime of the collaboration adapter session 164. Since the CA session manager 182 obtains the list of URLs of the documents (e.g., web pages) maintained at the copy server 190, the CA can reference the particular copy server session identification (i.e., as identified by the copy server session identification information 262) to effectively respond to such participant requests. This can be done, for example, by having the CA session manager 182 send a redirect URL to a participant requesting a page maintained in the copy server. The redirect includes the URL location information for the requested page in the copy server as well as the copy server session identification information 262.

Returning attention now to the processing steps shown in FIG. 7, once the servlet collaboration manager 260 provides the request 264 to the collaboration adapter 196, the collaboration adapter 196 (i.e., the CA session manager 182) responds to the request by returning collaboration adapter session identification information 132 (FIG. 1 and FIG. 5). In response to this action by the CA session manager 182, the servlet collaboration manager 260 performs the processing of step 413 in FIG. 7.

In step 413, the servlet collaboration manager 260 receives collaboration adapter session identification information 132 that includes i) a collaboration adapter session identification 266 that identifies a particular collaboration adapter session which is now in existence (i.e., under management) within the collaboration adapter 196 (i.e., under control of the CA session manager 182), and ii) document location information such as the URL for a single portion of document content information (e.g., the URL 303-1 of the top-level document 301-1 as maintained within the copy server 190) for initial shared access by participants to the collaboration adapter session. In other words, in step 413, the servlet process 162 receives a collaboration adapter session ID 266 that uniquely identifies a collaboration adapter session that is now in existence and further receives a top-level URL to which participant browsers (e.g., 125 through 127) are directed when those participant browsers join the collaboration adapter session.

Next, in step 414, the servlet collaboration manager 260 returns 270 the collaboration adapter session identification information 132 (FIG. 5 and generally FIG. 1) to browser within the client computer system 120 from which the content object 130 was initially received, such that browser (125 in the example in FIG. 1) on the client computer system 120 can participate in the shared collaboration adapter session 164.

In the example of an initiation of the collaboration adapter session 164 by a user of the browser process 125 as explained herein, step 414 causes the browser process 125 to receive a template HTML page that includes the URL for the first or top-level web page of the collaboration adapter session along with a collaboration adapter session ID that the participant browser process 125 can use to identify the particular collaboration adapter session to which the joins. In this manner, the servlet process 162 of the invention allows the participant browser process 125 to properly begin collaboration at the first web page of the collaboration adapter session.

In addition, as the collaboration adapter session progresses and more and more state information is built up within, for example, the browser process 125, the processing of the system of the invention can be repeated such that the browser process 125 transfers a current snapshot of browser state information in the form of a content object 130 to the servlet process 162 of the invention. This may happen at any time during the collaboration adapter session. Thus, if a complex history of browser state information is built up over a prolonged period of time during a collaboration adapter session, in the system of the invention is operated as explained herein to capture such browser state information into cache the browser state information within the copy server 190 for access by other participant browser's, should other participant browser's decide the join the collaboration adapter session at some later time, those other participant browser's will not need to begin the collaboration adapter session at the very first page in order to develop the complete history of browser state information. Instead, the servlet process 162 of the invention is able to gather and store such browser state information and periodic intervals during the collaboration adapter session for distribution to participant's that join sometime after the beginning of the collaboration adapter session. Accordingly, a participant browser that joins the collaboration adapter session in mid-session can simply obtain the current or most recent compilation of browser state information which exists within the copy server 190 (as managed by the collaboration adapter 196) as though the last time the servlet process 162 of the invention was able to perform (i.e., as of the last interval to which the servlet process 162 operated).

Embodiments of the invention thus allow participants to join a collaboration adapter session at any time and allow those participant browsers to come up to speed very quickly with the rest of the participants in a collaboration adapter session since those participant browser's can receive the most recent copy or edition of the browser state information as captured and managed by the servlet process 162 of embodiments of the invention. This avoids having those participant browsers that join sometime after the start of the collaboration adapter session from having to navigate to each and every web page from the start of the session in order to compile proper state information which is required for proper operation of the collaboration adapter session.

It is noted here that the processing of embodiments of the invention create a collaboration "adapter" session and return collaboration "adapter" session identification information to a client computer system. This is to be somewhat distinguished from a standard or conventional collaboration session which takes place between a client computer system and a collaboration server (not specifically shown in figures) in that the collaboration adapter session is a session that operates between a client and a collaboration adapter (e.g., Cisco System's Dynamic Content Adapter product) to establish a cache or store of content, web pages, or the like (e.g., 192) provided from an application such as an application served by the application server 195 in FIG. 4. The application server 195 might be a web sever serving web pages for example. In contrast, a collaboration session between a client computer system and a collaboration server manages and maintains the locations or pointers (e.g., URLs) of the content and ensures that all participant client computer systems that partake in the shared collaboration session are presented with the same content during the shared collaboration session. In other words, the collaboration adapter deals with obtaining and storing the content and content storage aspects of collaboration in general, whereas the collaboration server deals with managing the location or pointers such as URL to the content.

The foregoing description of embodiments of the invention are not intended to be limiting. Rather, any limitations to embodiments of the invention are presented in the following claims.

What is claimed is:

1. In a server computer system, a method for initiating a collaboration adapter session with a client computer system, the method comprising the steps of:
   receiving a content object from the client computer system;
   storing document content information contained within the content object for shared access by participants to the collaboration adapter session;
   generating collaboration adapter session identification information for the collaboration adapter session based on document location information contained within the content object and a copy server session identification; and
   returning the collaboration adapter session identification information to the client computer system such that the client computer system can participate in the collaboration adapter session.

2. The method of claim 1 wherein the step of storing the document content information comprises the step of:
   for each document content object identified in the content object:
   i) extracting the document content information associated with that document content object from the content object;
   ii) extracting document identity information associated with that document content object from the content object; and
   iii) transferring the document content information and the document identify information in a collaboration content database for shared access by participants to the collaboration adapter session.

3. The method of claim 2 wherein:
   at least one of the document content objects identified in the content object is a frameset document content object; and
   wherein when the step of extracting the document content information from the content object extracts a frameset document content object, the step of extracting modifies a source attribute of the frameset document content object to reference a subframe location of a subframe associated with the frameset document content object.

4. The method of claim 2 wherein the document identity information includes identifier content and the step of extracting document identity information from the content object comprises the steps of:
   obtaining the identifier content from the document identity information;
   obtaining identifier attributes from the server computer system;
   combining the identifier content and the identifier attributes to reconstitute a document identifier that is associated with the document content information.

5. The method of claim 4 wherein:
   the identifier content is cookie information;
   the identifier attributes are cookie attributes which include a domain name and a path associated with a location of the document content information; and
   the step of obtaining the identifier attributes obtains the cookie attributes from a configuration file in the server computer system associated with a domain identified by the content object.

6. The method of claim 2 wherein:
   the step of transferring transfers the document content information and the document identity information for each document content object identified in the content object to a copy server for shared access by participants to the collaboration adapter session; and
   wherein the step of storing further comprises, in response to the step of transferring, receiving a copy server session identification from the copy server.

7. The method of claim 6 wherein the step of generating collaboration adapter session identification information comprises the steps of:
   extracting document location information for any document content objects identified in the content object;
   providing, to a collaboration adapter, a request to establish a collaboration adapter session, the request including the document location information for each document content object in the content object;
   receiving, in response to providing the request, collaboration adapter session identification information including:
   i) a collaboration adapter session identification identifying the collaboration adapter session; and
   ii) document location information for a single portion of document content information maintained by the copy server for initial shared access by participants to the collaboration adapter session.

8. The method of claim 7 wherein the step of returning the collaboration adapter session identification information to the client computer system such that the client computer system can participate in the collaboration adapter session comprises the steps of:
   forwarding, to the client computer system, the collaboration adapter session identification information including:
   i) the collaboration adapter session identification identifying the collaboration adapter session; and
   ii) document location information for a single portion of document content information maintained by the copy server for initial shared access by participants to the collaboration adapter session.

9. A server computer system comprising:
   an interface;
   a memory;
   a processor; and
   an interconnection mechanism coupling the interface, the memory, and the processor;
   wherein the memory is configured with a collaboration servlet application, that when performed on the processor, provides a servlet process that causes the processor to initiate a collaboration adapter session with a client computer system, by performing the operations of:
   receiving, via the interface, a content object from the client computer system, the content object being placed in the memory;
   storing, in a copy server coupled to the interface, document content information contained within the content object for shared access by participants to the collaboration adapter session;
   generating, in the memory, collaboration adapter session identification information for the collaboration adapter session based on document location information contained within the content object and a copy server session identification; and
   returning the collaboration adapter session identification information to the client computer system, via the interface, such that the client computer system can participate in the collaboration adapter session.

10. The server computer system of claim 9 wherein when the servlet process performs the operation of storing the document content information, the servlet process performs, for each document content object identified in the content object, the operations of:
   i) extracting the document content information associated with that document content object from the content object in the memory;
   ii) extracting document identity information associated with that document content object from the content object in the memory; and
   iii) transferring, from the memory, the document content information and the document identify information into a collaboration content database coupled to the interface, for shared access by participants to the collaboration adapter session.

11. The server computer system of claim 10 wherein:
   at least one of the document content objects identified in the content object is a frameset document content object; and
   wherein when the servlet process performs the operation of extracting the document content information from the content object in the memory, the servlet process extracts a frameset document content object and modifies a source attribute of the frameset document content object in the memory to reference a subframe location of a subframe associated with the frameset document content object.

12. The server computer system of claim 10 wherein the document identity information in the memory includes identifier content and wherein when the servlet process performs the operation of extracting document identity information from the content object in the memory, the servlet process performs the operations of:
   obtaining the identifier content from the document identity information in the memory;
   obtaining identifier attributes from a storage location in the server computer system;
   combining the identifier content and the identifier attributes in the memory to reconstitute a document identifier in the memory that is associated with the document content information.

13. The server computer system of claim 12 wherein:
   the identifier content in the memory is cookie information;
   the identifier attributes in the memory are cookie attributes which include a domain name and a path associated with a location of the document content information; and
   wherein when the servlet process performs the operation of obtaining the identifier attributes from a storage location in the server computer system, the servlet process obtains the cookie attributes from a configuration file in the server computer system associated with a domain identified by the content object.

14. The server computer system of claim 10 wherein:
   the servlet process operation of transferring transfers the document content information and the document identity information for each document content object identified in the content object from the memory to a copy server via the interface for shared access by participants to the collaboration adapter session; and
   wherein when the servlet operation performs the operations of storing, the servlet process further performs, in response to the operation of transferring, an operation of receiving, via the interface, a copy server session identification from the copy server.

15. The server computer system of claim 14 wherein when the servlet process performs the operation of generating collaboration adapter session identification information, the servlet process performs the operations of:
   extracting document location information in the memory for any document content objects identified in the content object;
   providing, to a collaboration adapter via the interface, a request to establish a collaboration adapter session, the request including the document location information for each document content object in the content object;
   receiving, into the memory via the interface in response to providing the request, collaboration adapter session identification information including:
      i) a collaboration adapter session identification identifying the collaboration adapter session; and
      ii) document location information for a single portion of document content information maintained by the copy server for initial shared access by participants to the collaboration adapter session.

16. The server computer system of claim 15 wherein when the servlet process performs the operation of returning the collaboration adapter session identification information to the client computer system such that the client computer system can participate in the collaboration adapter session, the servlet process performs the operation of:
   forwarding, to the client computer system from the memory, via the interface, the collaboration adapter session identification information including:
      i) the collaboration adapter session identification identifying the collaboration adapter session; and
      ii) document location information for a single portion of document content information maintained by the copy server for initial shared access by participants to the collaboration adapter session.

17. A computer program product having a computer-readable medium including servlet application computer program logic encoded thereon for initiating a collaboration adapter session with a client computer system, such that the computer program logic, when performed on at least one processor within a server computer system, causes the at least one processor to perform the operations of:
   receiving a content object from the client computer system;
   storing document content information contained within the content object for shared access by participants to the collaboration adapter session;
   generating collaboration adapter session identification information for the collaboration adapter session based on document location information contained within the content object and a copy server session identification; and
   returning the collaboration adapter session identification information to the client computer system such that the client computer system can participate in the collaboration adapter session.

18. The computer program product of claim 17 wherein the computer program logic that causes the processor to perform the operation of storing the document content information further causes the processor to perform, for each document content object identified in the content object, the operations of:
   i) extracting the document content information associated with that document content object from the content object;

ii) extracting document identity information associated with that document content object from the content object; and iii) transferring the document content information and the document identify information in a collaboration content database for shared access by participants to the collaboration adapter session.

19. The computer program product of claim 18 wherein:
wherein the computer program logic that causes the processor to perform the operation of transferring transfers the document content information and the document identity information for each document content object identified in the content object to a copy server for shared access by participants to the collaboration adapter session; and wherein the computer program logic that causes the processor to perform the operation of storing further comprises, in response to the operation of transferring, receiving a copy server session identification from the copy server.

20. The computer program product of claim 19 wherein the computer program logic that causes the processor to perform the operation of generating collaboration adapter session identification information, causes the processor to perform the operations of:

extracting document location information for any document content objects identified in the content object;

providing, to a collaboration adapter, a request to establish a collaboration adapter session, the request including the document location information for each document content object in the content object;

receiving, in response to providing the request, collaboration adapter session identification information including:
  i) a collaboration adapter session identification identifying the collaboration adapter session; and
  ii) document location information for a single portion of document content information maintained by the copy server for initial shared access by participants to the collaboration adapter session.

21. The computer program product of claim 20 wherein the computer program logic that causes the processor to perform the operation of returning the collaboration adapter session identification information to the client computer system such that the client computer system can participate in the collaboration adapter session, further causes the processor to perform the operations of:

forwarding, to the client computer system, the collaboration adapter session identification information including:
  i) the collaboration adapter session identification identifying the collaboration adapter session; and
  ii) document location information for a single portion of document content information maintained by the copy server for initial shared access by participants to the collaboration adapter session.

22. A server computer system comprising:
an interface;
a memory;
a processor; and
an interconnection mechanism coupling the interface, the memory, and the processor;
wherein the memory is configured with a collaboration servlet application, that when performed on the processor, provides a means for causing the processor to initiate a collaboration adapter session with a client computer system, such means including:

means for receiving, via the interface, a content object from the client computer system, the content object being placed in the memory;

means for storing, in a copy server coupled to the interface, document content information contained within the content object for shared access by participants to the collaboration adapter session;

means for generating, in the memory, collaboration adapter session identification information for the collaboration adapter session based on document location information contained within the content object and a copy server session identification; and means for returning the collaboration adapter session identification information to the client computer system, via the interface, such that the client computer system can participate in the collaboration adapter session.

23. In a server computer system, a method for initiating a collaboration adapter session with a client computer system, the method comprising receiving content object;

obtaining document content object within said content object;

extracting document content information from document content object;

extracting document identity information including identifier content from said content object;

obtaining identifier attributes from the server computer;

combining the identifier content and identifier attributes to reconstitute a valid document identifier associated with said document content information;

transferring said document content information and said document identity information to a copy server for shared access by participants to a collaboration server; and receiving copy server session identification information from the copy server.

24. The method of claim 23 further comprising:
determining whether the content object comprises a frameset document content object; and modifying a source attribute of said frameset document content object to reference a subframe location of a subframe associated with said frameset document content object when said content object comprises a frameset document content object.

25. The method of claim 23 wherein said combining further comprises determining whether there are other document content objects to be processed in the content object and when there are other document content objects to be processed then performing said obtaining document content object within said content object, said extracting document content information from document content object, said extracting document identity information from said content object, said obtaining identifier attributes from the server computer, and said combining identifier content and identifier attributes to reconstitute a valid document identifier associated with said document content information.

26. In a server computer system, a method for initiating a collaboration adapter session with a client computer system, the method comprising:

extracting document location information for document content objects identified in a content object;

providing to a collaboration adapter a request to establish a collaboration adapter session;

receiving collaboration adapter session identification information; and returning the collaboration adapter session identification information to the client computer system such that the client computer system can participate in the shared collaboration adapter session, wherein said request includes at least one of document location information for a document content object in the content object, and a copy server session identification.

27. The method of claim 26 wherein said collaboration adapter session identification information includes at least one of a collaboration adapter session identification identifying the collaboration session, and document location information for a portion of document content information maintained by a copy server for initial shared access by participants to the collaboration adapter session.

28. A server computer system comprising:
an interface;
a memory;
a processor; and
an interconnection mechanism coupling the interface, the memory, and the processor;
wherein the memory is configured with a collaboration servlet application, that when performed on the processor, provides a servlet process that causes the processor to initiate a collaboration adapter session with a client computer system, by performing the operations of:
receiving content object;
obtaining document content object within said content object;
extracting document content information from document content object;
extracting document identity information from said content object;
obtaining identifier attributes from the server computer;
combining identifier content and identifier attributes to reconstitute a valid document identifier associated with said document content information;
transferring said document content information and said document identity information to a copy server for shared access by participants to a collaboration server; and
receiving copy server session identification information from the copy server.

29. The server computer system of claim 28 wherein the servlet process performs the operations of:
determining whether the content object comprises a frameset document content object; and
modifying a source attribute of said frameset document content object to reference a subframe location of the subframe associated with said frameset document content object when said content object comprises a frameset document content object.

30. The server computer system of claim 28 wherein the operation of combining further comprises determining whether there are other document content objects to be processed in the content object and when there are other document content objects to be processed then performing said obtaining document content object within said content object, said extracting document content information from document content object, said extracting document identity information from said content object, said obtaining identifier attributes from the server computer, and said combining identifier content and identifier attributes to reconstitute a valid document identifier associated with said document content information.

31. A server computer system comprising:
an interface;
a memory;
a processor; and
an interconnection mechanism coupling the interface, the memory, and the processor;
wherein the memory is configured with a collaboration servlet application, that when performed on the processor, provides a servlet process that causes the processor to initiate a collaboration adapter session with a client computer system, by performing the operations of:
extracting document location information for document content objects identified in a content object;
providing to a collaboration adapter a request to establish a collaboration adapter session;
receiving collaboration adapter session identification information; and
returning the collaboration adapter session identification information to the client computer system such that the client computer system can participate in the shared collaboration adapter session, wherein said request includes at least one of document location information for a document content object in the content object, and a copy server session identification.

32. The server computer system of claim 31 wherein said collaboration adapter session identification information includes at least one of a collaboration adapter session identification identifying the collaboration session, and document location information for a portion of document content information maintained by the copy server for initial shared access by participants to the collaboration adapter session.

33. A computer program product having a computer-readable medium including servlet application computer program logic encoded thereon for initiating a collaboration adapter session with a client computer system, such that the computer program logic, when performed on at least one processor within a server computer system, causes the at least one processor to perform the operations of:
receiving content object;
obtaining document content object within said content object;
extracting document content information from document content object;
extracting document identity information from said content object;
obtaining identifier attributes from the server computer;
combining identifier content and identifier attributes to reconstitute a valid document identifier associated with said document content information;
transferring said document content information and said document identity information to a copy server for shared access by participants to a collaboration server; and
receiving copy server session identification information from the copy server.

34. The computer program product of claim 33 wherein the servlet process performs the operations of:
determining whether the content object comprises a frameset document content object; and
modifying a source attribute of said frameset document content object to reference a subframe location of the subframe associated with said frameset document content object when said content object comprises a frameset document content object.

35. The computer program product of claim 33 wherein the operation of combining further comprises determining whether there are other document content objects to be processed in the content object and when there are other document content objects to be processed then performing said obtaining document content object within said content object, said extracting document content information from document content object, said extracting document identity information from said content object, said obtaining identifier attributes from the server computer, and said combining identifier content and identifier attributes to reconstitute a valid document identifier associated with said document content information.

36. A computer program product having a computer-readable medium including servlet application computer program logic encoded thereon for initiating a collaboration adapter session with a client computer system, such that the computer program logic, when performed on at least one processor within a server computer system, causes the at least one processor to perform the operations of:

extracting document location information for document content objects identified in a content object;

providing to a collaboration adapter a request to establish a collaboration adapter session;

receiving collaboration adapter session identification information; and returning the collaboration adapter session identification information to the client computer system such that the client computer system can participate in the shared collaboration adapter session, wherein said request includes at least one of document location information for a document content object in the content object, and a copy server session identification.

37. The computer program product of claim 36 wherein said collaboration adapter session identification information includes at least one of a collaboration adapter session identification identifying the collaboration session, and document location information fro a portion of document content information maintained by the copy server for initial shared access by participants to the collaboration adapter session.

\* \* \* \* \*

UNITED STATES PATENT AND TRADEMARK OFFICE
CERTIFICATE OF CORRECTION

PATENT NO. : 7,003,550 B1  Page 1 of 1
APPLICATION NO. : 09/794863
DATED : February 21, 2006
INVENTOR(S) : Andrew R. Cleasby and Charles D. Cummings It is certified that error appears in the above-identified patent and that said Letters Patent is hereby corrected as shown below:

Claim 23, Column 24, Line 20, "the method comprising" should read -- the method comprising: --.

Signed and Sealed this

Fifth Day of September, 2006

JON W. DUDAS
*Director of the United States Patent and Trademark Office*